Patented Jan. 4, 1944

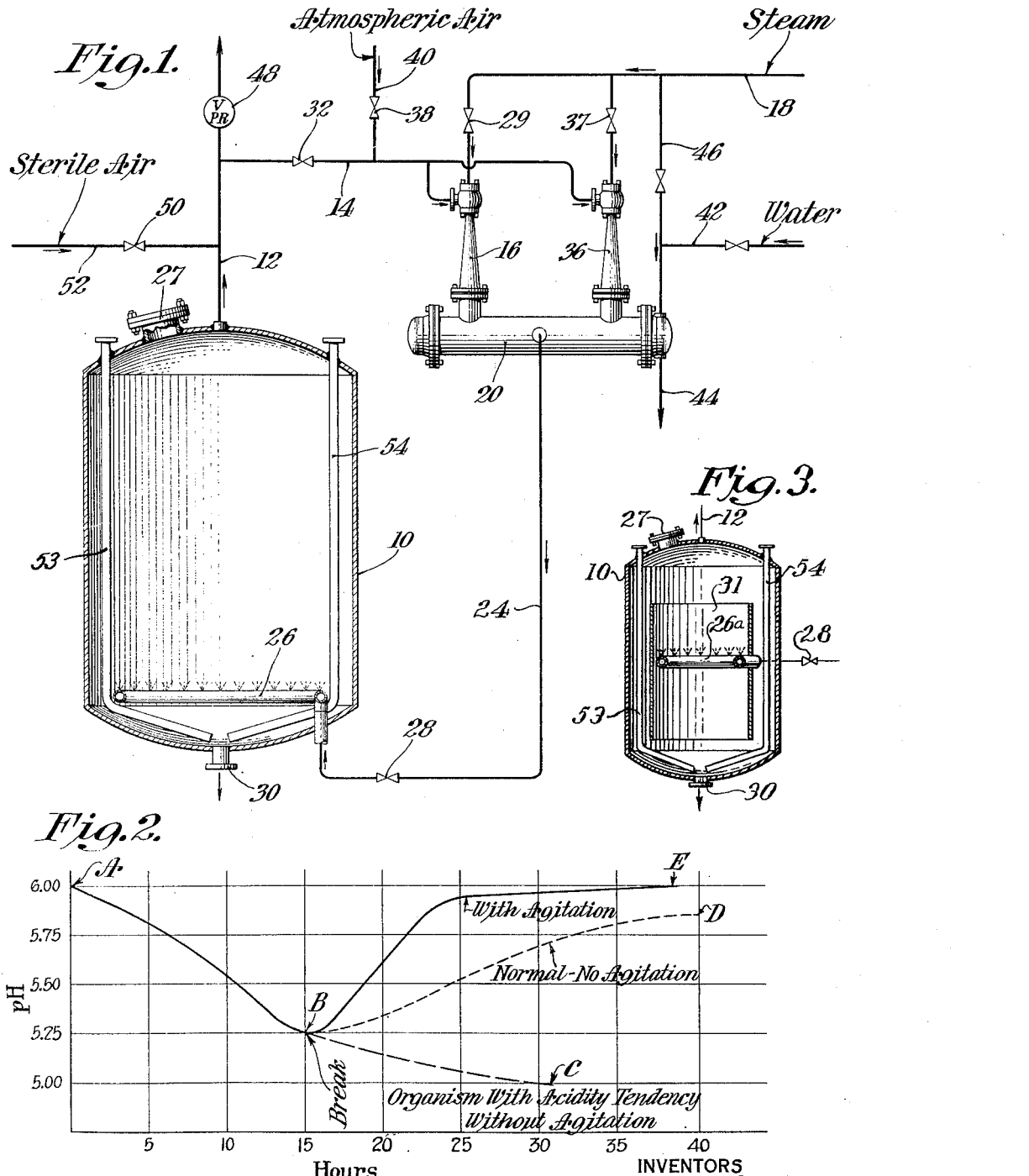

2,338,228

UNITED STATES PATENT OFFICE 2,338,228

FERMENTATION

Benjamin Clark Boeckeler, Riverside, Conn., and Marcel J. P. Bogart, Teaneck, N. J., assignors to The Lummus Company, New York, N. Y., a corporation of Delaware Application September 20, 1941, Serial No. 411,630

11 Claims. (Cl. 195—142)

This invention relates to improvements in the art of fermentation and more specifically relates to improved apparatus useful therein. It is a continuation-in-part of our copending application, Ser. No. 371,536, filed December 24, 1940, and entitled "Fermentation."

In our copending application, we have referred to an improved process for controlling the fermentation of carbohydrate-containing mashes by bacteria such as the butyl bacteria which produce industrial solvents including butyl alcohol and the like. Reference was also made to apparatus which is adapted to assist in carrying out the process of fermentation as well as to permit effective cleaning and sterilization of the fermenter in preparation for a subsequent fermentation.

It is the principal object of our present invention to provide accessory apparatus that is adapted to facilitate fermentation operations including agitation during fermentation and cleaning and sterilization afterwards, which apparatus is without moving parts, is simple to maintain, and is unlikely to become infected or to carry infection.

More specifically, the present invention contemplates the use of heat exchangers and steam ejectors so arranged as to permit the sequential operations of high pressure, low velocity agitation of the mash during fermentation followed by low pressure, high temperature sterilization of the fermenter followed, in turn, by low pressure cooling of the fermenter.

Further objects and advantages of the invention will appear from the following description of a preferred form of embodiment thereof taken in connection with the attached drawing illustrative thereof, in which:

Fig. 1 is a diagrammatic view of one form of the fermenter and accessory apparatus;

Fig. 2 is a diagrammatic view of a pH-time curve; and

Fig. 3 is a vertical sectional view showing the fermenter equipped with a gas-distributing means of modified form.

In accordance with a preferred application of our invention, we propose to ferment a Puerto Rican blackstrap molasses having a sugar concentration in the mash varying from 5.0% to 6.0% and usually about 5.5%. In industrial operations, such a mash of a desired consistency is placed in a tank in which the fermentation can be carried out. Such a tank holds from 50,000 to 100,000 gallons; and, for our particular operations, the tank 10 of Fig. 1 holds approximately 62,000 gallons of mash and is approximately 23' 6" in diameter by 28' maximum depth. Inoculation of this mash with a suitable butyl inoculum, for example, is accomplished in any desired manner, it being understood that the mash has theretofore been sterilized and cooled to the desired fermentation temperature of approximately 31° C.

As is well known, during the initial stages of a butyl fermentation the pH of the mash drops; this characteristic appears to result from excessive formation of acids. This drop may continue during the first twelve to eighteen hours, and the pH of the mash may show a typical drop from 6.00 to 5.25. A definite "break" then occurs in the successful fermentations, and the pH starts to rise. If this "break" does not occur and the pH continues to fall, the fermentation, almost without exception, fails to produce a satisfactory yield of solvents.

It has generally been found that neuralizing agents, specifically alkaline neutralizing agents such as calcium carbonate, are helpful in maintaining the pH within the desired limits. The results of many investigators referred to in the literature are very inconsistent, however, both as to whether or not such agents are necessary and as to whether or not they reduce yields rather than increase them if used. Some consideration has also been given as to the relative fineness of the neutralizing agent, but there does not appear to be any substantial evidence that this feature has any particular importance. On the contrary, we believe and have now demonstrated that fermentations depend on adequate dispersion of the alkaline material, which dispersion is a function of the bubbling or gassing action due to the gases liberated during fermentation rather than the fineness of the neutralizing agent. Where an organism is used that is not a heavy gasser and especially where a very deep mash is being fermented, the agitation of the mash solely due to the liberated gas may be insufficient to effect the desired neutralization.

We have satisfied ourselves that this is an important factor in industrial fermentations which are carried out in such large scale apparatus; for many operations which were entirely successful in the laboratory were wholly and inexplicably unsatisfactory in the large tanks. Furthermore, other factors being the same, we find it possible, with agitation, to use common grades of neutralizing agent rather than the especially finely ground material which commands an extra premium. Smaller quantities are also equally effective.

The neutralizing agent, which is preferably calcium carbonate, is added to the mash at the beginning of the operations so that it will be available during the entire operations. It need be present in an amount only slightly in excess of the theoretical requirement. Although in one case we used as much as 0.40% total calcium carbonate or 0.11% excess based on the weight of the entire mash, we also had successful fermentations using only 0.01% excess. This is, of course, far lower than heretofore thought necessary.

Agitation of the fermenting mash to completely distribute the neutralizing agent is accomplished in accordance with our invention by removal of a part of the fermenter gases formed during the fermentation through the conduits 12 and 14 and conducting such gases to the steam ejector booster 16 which is supplied with steam from the steam line 18. The gases which are removed at low pressure from the tank 10, are compressed to a desired degree and are discharged through the heat exchanger 20 maintained at the desired temperature by steam or water, through the gas line 24 and into a sparger pipe 26, such gases being under control of the valve 28. The steam line to the ejector is under control of the valve 29.

We find that with a fermenter of the size heretofore described, improved agitation can be accomplished when the sparger pipe is at the bottom of the fermenter by increasing the gas pressure from the usual ½ or 1 pound gage to a discharge pressure of 18 to 20 pounds gage at the sparger pipe. If, however, the sparger pipe is placed intermediate the top and bottom of the tank 10, as shown in Fig. 3, and suitable baffle means are provided in the shape of a hollow vertical cylinder 31 surrounding the sparger pipe 26a, circulation can be accomplished with approximately one-half of the pressure required above. In either case a broad sweeping effect on the mash is accomplished which will afford a satisfactory neutralizing effect of the neutralizing agent.

The amount of agitation which is required is preferably observed from the predetermined pH control curves which may be established. As will appear from Fig. 2 in which the pH values are set out as ordinates, and time in hours is the abscissae, the portion of the curve from A to B represents the usual and customary pH drop during the initial stages of a fermentation. The curve from B to C is a continuation of the curve A—B when a fermentation break does not occur and the mash turns acid. This is the usual result when the organism has an acid tendency and no agitation is provided. The curve from B to D is typical of a slow recovery occasioned by excessive neutralization without agitation; and, although the mash is neutralized and shows no acidity, the absence of agitation appears to reduce the yield of solvents, and the time of fermentation is increased.

The curve from B to E is typical of the operation when the mash is agitated in accordance with our invention and the minimum amount of alkaline neutralizing agent is used and made effective at the correct time. In this case the pH value immediately rises with a maximum yield of solvents in the minimum time period. This result makes it possible to use organisms of relatively low gassing power which are otherwise superior but would normally have to be eliminated from use because of their too frequent production of acid mashes.

We have estimated that the use of only 0.01 to 0.11% excess calcium carbonate based on the weight of the mash as against 3% to 10% excess calcium carbonate based on the weight of sugar as heretofore suggested will show a saving in calcium carbonate cost in a plant designed to produce six million pounds of solvents per year in the neighborhood of from $4500 to $12,000 per year where the cost of the calcium carbonate is $15.00 per ton. In addition, the amount of ammonium sulphate or other nutrient used may be reduced by approximately one-half, which saving will be in the neighborhood of $9600 per year. Other savings may be obtained by using a common grade of calcium carbonate rather than the more expensive finer grades. No operating parts requiring elaborate maintenance are necessary. The jet ejector and condenser are relatively simple to control and inexpensive to install. Furthermore, normal sedimentation is avoided, and added yields of solvents are obtained with the carrying over of precipitated material completely avoided.

Another very important advantage to the use of the gases of the particular fermentation for this agitation is that there can be no possibility of infiltration of air, and cross infection from one fermenter to another by this apparatus is strictly avoided. The loss of solvents which would normally be carried out by the gases is prevented. It is possible to limit the size of the fermenter since no gas is added; and the stripping of solvents from the mash is not affected by the mere recirculation of these gases. The fermentation gases are also the environment of the organism which, particularly if it is anaerobic as most butyl organisms are, is not disturbed by the recirculation of the gases as it would be if air were used. Agitation is preferably accomplished only after the oxygen in the fermenter is completely eliminated by the carbon dioxide formed so as not to disturb the oxidation-reduction potential.

After the fermentation has been completed, manhole cover 27 is removed, and the fermented mash is withdrawn from vessel 10 through outlet 30. The vessel 10 then contains a mixture of fermenter gases and air which has entered through the open manhole. During the withdrawal of the fermented mash, valves 32 and 28 in lines 14 and 24 may be closed if desired. Before the vessel can be used for another fermentation, however, it is necessary to remove the fermenter gases and to sterilize the vessel.

A secondary steam jet ejector 36, steam for which is also supplied by line 18, is now brought into operation. Valve 38 in atmospheric air line 40 is opened, valve 28 is opened, and air is then forced through exchanger 20 and sparger 26 to sweep the mixture of fermenter gases and air from vessel 10. The design of ejector 36 is preferably such that it has a very high capacity against a low head. While this operation is being carried on, water from line 42 is circulated through exchanger 20 to condense the steam from the ejector and to maintain the air in cooled condition. Although the use of such cooling water is desirable to cool the fermenter sufficiently to enable a person to later enter and inspect the fermenter, it may be omitted. This operation is continued until substantially all the fermenter gases have been eliminated from the fermenter.

When the fermenter gases have been removed and all deposits of solids or the like remaining in the fermenter are cleaned out, the fermenter is sterilized. Manhole cover 27 is replaced, valve 32 is again opened, valve 38 is closed, and steam from line 18 through line 46 is passed through heat exchanger 20. Any condensate that may form from this steam is removed through the line 44. The steam in line 18 is preferably at a pressure considerably above atmospheric so that it will be possible to materially raise the temperature of the mixture of air and steam circulated through vessel 10. The circulation of air and steam is continued until the desired degree of approach to sterility has been obtained. Pressure relief valve 48 is provided to prevent the pressure in vessel 10 from becoming excessive.

Because of the resulting temperature difference between the interior of vessel 10 and the external atmosphere, some steam condensation will take place on the pipe walls and the surfaces of the fermenter. The rate of heat input to the fermenter, however, is maintained such that the resulting average temperature in vessel 10 will be substantially above 212° F. and is nearly that of the superheated steam and will be sufficient to insure destruction of bacteria. The so-called "wet heat" thus obtained on the fermenter surface is particularly effective in the destruction of bacteria. By appropriate operation of ejector 36, under control of valve 37, it is readily possible to maintain a sufficiently elevated temperature in the fermenter for as long a period as may be desired.

Following the sterilization treatment, it is desirable to cool down the fermenter prior to the introduction of fresh mash for the next fermentation. In this case, it is preferable to introduce entirely sterile air instead of atmospheric air to compensate for the decrease in volume caused by the condensation of the steam. This operation is accomplished by opening valve 50 in sterile air line 52. Water is again passed through the heat exchanger 20, and the sterile air is circulated by means of ejector 36 through the fermenter, which can thus be rapidly cooled to the desired degree. The condensate is preferably retained in the vessel. At the completion of such operation, the fermenter contains sterilized air at room temperature and atmospheric pressure. Then, after valve 50 has been closed, fresh mash may be charged to fermenter 10 through inlet 53 and subsequently inoculated with the appropriate organism introduced through the inlet 54 for fermentation.

The application of our invention to the 10,000 cubic foot fermenter heretofore mentioned will now be described. In this particular case, ejector 36 is designed to circulate 500 cubic feet per minute of air against approximately a one pound per square inch gage head. About twenty minutes are required under these conditions to completely sweep the fermenter gases out of the fermenter. The steam for operating the ejectors and for passage through exchanger 20 is at a pressure of 150 pounds per square inch gage, which is considerably in excess of the pressure that the fermenter vessel can normally withstand. With such a pressure, it is possible to obtain a temperature as high as 350° F. within the fermenter. Since the steam used to operate the ejector is at a low pressure after passing therethrough, it will be considerably superheated. The temperature thus obtained is materially greater than that which could be obtained if steam at low pressure, which the fermenter can normally withstand, is introduced directly thereinto. Such temperature may be compared with the 250° F. temperature of fifteen pounds per square inch gage saturated steam.

About twenty minutes suffice to bring the fermenter to the proper sterilization temperature, at which the fermenter will be held for a sufficient length of time (in this case, two hours) to accomplish the desired approach to sterility. About 200 pounds of steam will be introduced into the fermenter and will occupy about one-fourth of the volume of the fermenter; the balance of the fermenter volume will be occupied by air. At the end of this operation, water is again passed through exchanger 20, and sterile air circulated through the fermenter for a period of thirty minutes, at the end of which time the fermenter is ready to receive a new batch of fermentable mash.

It will be appreciated that the effectiveness of any fermentation process depends upon a maintenance cycle similar to that herein set forth and the economy of utilities required to place the fermenting apparatus in operating condition. Since no low pressure air system is required, it is possible to eliminate the otherwise necessary blower which, in the above application of our invention, would require a capacity of 700 cubic feet per minute. Furthermore, the necessary apparatus to filter and sterilize the air introduced through line 52 is somewhat smaller since a less amount of sterile air is required. A considerable saving in equipment is thus made possible. There is also a material steam saving because a smaller volume of steam is introduced into the fermenter and less condensation takes place on the walls due to the blanketing effect of the air.

The apparatus for sterilization and cleaning includes at least two essential elements, namely, the sparger 26 and the heat exchanger 20, which are especially adapted for and necessary to the agitation of the mash during fermentation. For the purpose of agitation, an ejector is used which will operate against an eighteen pounds per square inch head and have a capacity of 80 cubic feet per minute. Since the capacity of the two ejectors differs greatly and since the head against which each must operate is different, it is ordinarily cheaper to operate different ejectors for the different duties although one may be utilized for both purposes.

The use of the steam jet ejector to boost the pressure on the gases being circulated also has the advantage that a further source of contamination of the fermented mash is eliminated. This feature is particularly important when an anaerobic organism is used as the fermenting agent. No contamination of the gases being compressed can take place in the steam ejector inasmuch as its interior surfaces which come into contact with the circulating gases are continually subjected to the action of steam and inasmuch as there are no moving parts or projections to become fouled. Circulation of sterile gases is thus insured, and the variable degree of purity of gases that are compressed by compressors, pumps, and the like, which have projections and moving parts that furnish a source of contamination, is avoided. It will be appreciated that sterile gases are desirable for agitation as well as for sterilization.

The agitation carried out in accordance with our invention is also applicable to butyric acid fermentations in which, to a lesser degree, non-mechanical agitation is highly desirable and will maintain optimum conditions throughout all parts of the fermenter during the entire fermentation period. Similarly, the apparatus is adapted to sterilize and clean fermenters regardless of their fermentation reactions.

While we have shown a preferred form of embodiment of our invention, we are aware that modifications may be made thereto; and we, therefore, desire a broad interpretation of our invention within the scope and spirit of the description herein and of the claims appended hereinafter.

We claim:

1. The combination of a fermenter of the class described, an offtake conduit to conduct fermentation gas from the fermenter, a steam jet ejector booster to compress said gas, means to feed said compressed gas to the fermenter, and means in the fermenter to distribute the gas throughout the fermenter.

2. Apparatus for the bacterial fermentation of a carbohydrate mash, which comprises a fermentation vessel for said mash, means to vent from said vessel the fermentation gas generated by the action of the bacteria on said mash, means to divert a portion of said gas, a steam jet ejector booster to increase the pressure on said diverted gas, a sparger pipe in the lower portion of said fermenter to distribute said compressed gas through said mash for agitation thereof, and means to conduct the compressed gas to the sparger pipe.

3. The combination of a fermenter of the class described, means to conduct fermentation gas from the fermenter, a steam jet ejector booster to compress said gas, means to feed said compressed gas to the fermenter, and means in the fermenter to distribute the gas throughout the fermenter, said gas distributing means comprising a sparger pipe near the middle of the fermenter and baffle means surrounding said sparger pipe and tending to form an internal recirculation of mash through the fermenter and around the baffle.

4. In combination with a fermenter, a plurality of steam jet ejectors having different operating characteristics, a heat exchanger in communication therewith, means to alternately pass a heating or a cooling medium through said exchanger, means to conduct compressed and temperature-conditioned gases from said exchanger to said fermenter, and means to circulate gases from said fermenter alternately to one of said ejectors.

5. In combination with a fermenter, a steam jet ejector and a heat exchanger interconnected therewith, means to cool air forced through said exchanger by said ejector, means to interconnect the heat exchanger with said fermenter whereby the cooled air may be introduced to the fermenter to sweep vapors therefrom, means to heat air forced through said exchanger by said ejector, said interconnecting means introducing said heated air and the steam exhaust of said ejector into said fermenter to produce a hot moist vapor destructive to bacteria, and means to cool a supply of sterile air in said exchanger, said ejector forcing said cooled sterile air into the fermenter to reduce the temperature of the fermenter and to fill the vessel therewith.

6. In combination with a fermenter, a plurality of steam jet ejectors, one of which has a low capacity against a relatively high head and another of which has a high capacity against a relatively low head, a heat exchanger in communication with said ejectors, means to alternately pass a cooling or a heating medium through said exchanger, and means to conduct gases from said fermenter alternately to one of said ejectors whereby fermenter gases may be circulated under a high head through the fermenter for agitation of the mash during fermentation and superheated steam may be circulated under a low head through the fermenter to accomplish rapid sterilization thereof after the fermented mash has been removed.

7. In combination with a fermenter, a pair of steam jet ejectors, one of which has a low capacity against a relatively high head and the other of which has a high capacity against a relatively low head, a heat exchanger through which said ejectors discharge, means to pass alternately a cooling or a heating medium through said heat exchanger, a gas distributor in said fermenter, means to interconnect said gas distributor with said heat exchanger whereby the gases discharged by said ejectors may be distributed through said fermenter, means to interconnect said ejectors with an atmospheric air supply and a sterile air supply, means to interconnect said ejectors with the top of the fermenter whereby gases may be circulated through said fermenter by said ejectors, means to circulate fermenter gases by said low capacity ejector during fermentation and during passage of the cooling medium through said exchanger to agitate the fermenting mash, and means to alternately pass atmospheric air and sterile air to said high capacity ejector and to circulate a mixture of air and steam by said high capacity ejector during passage of the cooling medium and the heating medium respectively through said exchanger to effect sterilization of the fermenter.

8. In combination with a fermenter, heat-conditioning apparatus operable for heating and for cooling a gas and in delivery connection with said fermenter to supply temperature-conditioned gas thereto, means to distribute said conditioned gas within the fermenter, valved conduits connected to the heat-conditioning apparatus to conduct thereto selectively, for temperature-conditioning, gas from the fermenter for agitation of the mash during fermentation or a gas from another source to heat-condition the fermenter when the latter is empty, and steam jet ejector means to force flow of the selected one of said gases through the heat-conditioning apparatus and to the fermenter.

9. In combination with a fermenter, heat-conditioning apparatus operable for heating and for cooling a gas and in delivery connection with said fermenter to supply temperature-conditioned gas thereto, means to distribute said conditioned gas within the fermenter, valved conduits connected to the heat-conditioning apparatus to conduct thereto selectively gas from the fermenter, atmospheric air, or sterile air for temperature-conditioning and delivery to the fermenter, and forced-draft means to cause flow of the selected one of said gases through the heat-conditioning apparatus and to the fermenter.

10. In combination with a fermenter, a pair of steam jet ejectors, one of low capacity against a relatively high head and the other of high capacity against a relatively low head and both in delivery connection with said fermenter, an offtake conduit leading from the fermenter and in delivery connection with said low capacity ejector for withdrawal of fermentation gases from the fermenter and for recirculation of the withdrawn gases to the fermenter by the low capacity ejector for agitation of the mash during fermentation, a valve to open and close said conduit, a conduit in delivery connection with said high capacity ejector to conduct to the latter a gas from another source for delivery by the high capacity ejector to the fermenter to condition the latter when empty, and a valve to open and close said second conduit.

11. In combination with a fermenter, a pair of steam jet ejectors, one of low capacity against a relatively high head and the other of high capacity against a relatively low head and both in delivery connection with said fermenter, an offtake conduit leading from the fermenter and in delivery connection with said low capacity ejector for withdrawal of fermentation gases from the fermenter and for recirculation of the withdrawn gases to the fermenter by the low capacity ejector for agitation of the mash during fermentation, a valve to open and close said conduit, a conduit in delivery connection with said high capacity ejector to conduct to the latter a gas from another source for delivery by the high capacity ejector to the fermenter to condition the latter when empty, a valve to open and close said second conduit, and heat-conditioning means to temperature-condition said gases differentially prior to delivery thereof to the fermenter.

BENJAMIN CLARK BOECKELER.
MARCEL J. P. BOGART.